United States Patent
Blatt et al.

(10) Patent No.: US 11,334,878 B2
(45) Date of Patent: May 17, 2022

(54) COMBINING EXPLICIT AND IMPLICIT FEEDBACK IN SELF-LEARNING FRAUD DETECTION SYSTEMS

(71) Applicant: EMC IP Holding Company LLC, Hopkinton, MA (US)

(72) Inventors: Marcelo Blatt, Modiin (IL); Alon Kaufman, Herut (IL); Yael Villa, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 127 days.

(21) Appl. No.: 16/539,394

(22) Filed: Aug. 13, 2019

(65) Prior Publication Data
US 2020/0034831 A1    Jan. 30, 2020

Related U.S. Application Data (63) Continuation of application No. 13/832,468, filed on Mar. 15, 2013, now abandoned.

(51) Int. Cl.
G06Q 20/40    (2012.01)
G06Q 20/38    (2012.01)

(52) U.S. Cl.
CPC ................... *G06Q 20/382* (2013.01)

(58) Field of Classification Search
CPC ............ G06Q 20/4016; G06Q 20/382
USPC ......................................... 705/39
See application file for complete search history.

(56) References Cited

U.S. PATENT DOCUMENTS

| | | | |
|---|---|---|---|
| 6,108,583 A | 8/2000 | Schneck et al. | |
| 7,673,793 B2 | 3/2010 | Greene et al. | |
| 7,908,649 B1 | 3/2011 | Arora et al. | |
| 8,082,349 B1 | 12/2011 | Bhargava et al. | |
| 8,880,441 B1 * | 11/2014 | Chen .................. | G06Q 30/0185 706/12 |
| 2005/0154701 A1 | 7/2005 | Parunak et al. | |
| 2007/0232398 A1 | 10/2007 | Aikin et al. | |
| 2010/0036672 A1 | 2/2010 | Li et al. | |
| 2011/0225076 A1 | 9/2011 | Wang et al. | |
| 2013/0080368 A1 | 3/2013 | Nandy | |

(Continued)

OTHER PUBLICATIONS

Dialog NPL (non-patent literature) Search, dated Jan. 14, 2022. (Year: 2022).*

(Continued)

*Primary Examiner* — Hai Tran
(74) *Attorney, Agent, or Firm* — BainwoodHuang (57) ABSTRACT

An improved technique involves including implicit feedback inferred from a fraud analyst's actions into a fraud detection model tuning process. Along these lines, as part of a tuning process, an authentication server sends electronic transactions carrying a certain amount of risk to a case management center in which fraud analysts investigate the electronic transactions to verify whether the transactions are fraudulent or non-fraudulent. In addition to receiving this explicit feedback from the case management center, however, the authentication server also receives implicit feedback indicative of attributes of the fraud analysts themselves. The authentication server then inputs these implicit feedback parameter values into a fraud detection model tuning engine that tunes the fraud detection model.

13 Claims, 5 Drawing Sheets

(56) References Cited

U.S. PATENT DOCUMENTS

2013/0103629 A1    4/2013  Vaiciulis et al.
2015/0073981 A1*  3/2015  Adjaoute ........... G06Q 30/0225
                                                705/39

OTHER PUBLICATIONS

Google Scholar Search, dated Jan. 14, 2022. (Year: 2022).*
Google NPL (non-patent literature) Search, dated Jan. 14, 2022. (Year: 2022).*
Granka et al., "Eye-Tracking Analysis of User Behavior in WWW Search", SIGIR '04, The 27th ACM/SIGIR International Symposium on Information Retrieval 2004; Sheffield, United Kingdom, Jul. 25-29, 2004, 2 pages.

* cited by examiner

| | Number of Clicks/Display Time | 0-2 sec | 3-20 sec | 20-60 sec | 1-3 min | 3-10 min | 10+ min |
|---|---|---|---|---|---|---|---|
| 74 | 1-2 clicks | 0.01 | 0.02 | 0.04 | 0.08 | 0.08 | 0.0001 |
| | 3-5 clicks | 0.001 | 0.04 | 0.08 | 0.16 | 0.16 | 0.0002 |
| | 6-10 clicks | 0.0001 | 0.01 | 0.08 | 0.32 | 0.32 | 0.0004 |
| | 10+ clicks | 0.00001 | 0.005 | 0.01 | 0.02 | 0.04 | 0.08 |

Sending the electronic transactions to a fraud analyst, the fraud analyst serving to perform a manual investigation of the electronic transactions for fraud
92

Receiving a message that includes values of a set of implicit feedback parameters, each implicit feedback parameter of the set of implicit feedback parameters corresponding to a behavioral attribute indicative of a behavior of the fraud analyst
94

Inputting the values of the set of implicit feedback parameters into a fraud detection model tuning engine which serves to tune the fraud detection model based on factors including the values of the set of implicit feedback parameters
96

Figure 5

COMBINING EXPLICIT AND IMPLICIT FEEDBACK IN SELF-LEARNING FRAUD DETECTION SYSTEMS

BACKGROUND

Fraud detection systems mitigate risk in processing electronic transactions by flagging those transactions believed to exhibit irregular behavior. For example, suppose that a bank customer normally logs into his account from London between 4 and 6 PM. Suppose further that the bank receives a series of login attempts to that account between the hours of 2 and 4 AM from a location in Texas. A fraud detection system may flag such a transaction for further corroboration. An example of such corroboration is sending a message to the email account of the bank account holder with instructions for further verification of identification.

Fraud detection systems such as those found in adaptive authentication systems use a risk score to quantify the risk involved in processing an electronic transaction. Such systems build models of risk based on observed behaviors that are historical indicators of a risk of fraud. To continue the above example, that fraud detection system may assign a low risk score to a login attempt from London at the end of a work day and a high risk score to a login attempt from Texas in the middle of the night. In this case, observed behaviors such as being in a particular location for the first time or sending login attempts at irregular times serve as indicators of risky behavior.

Some fraud detection systems employ a machine learning process to build and update a model used to assess the risk of processing an electronic transaction. Conventional fraud detection model tuning processes employ explicit feedback from fraud investigators. Such explicit feedback typically consists of an assessment of particular transactions as either being fraudulent or non-fraudulent based on the results of a manual investigation. A machine learning module takes in the results of the manual investigation and updates the model to account for differences between predictions of the model and results of the manual investigation.

SUMMARY

Unfortunately, there are deficiencies with the above-described conventional fraud detection model tuning processes. For example, the ability to tune fraud detection models based on explicit feedback alone is limited. Along these lines, the cost of carrying out the investigations that generate the results used as input into a machine learning process may be expensive. With a finite budget for investigations, the amount of input for the machine learning process is limited.

Also, the quality of the explicit feedback may not be uniform. Investigating fraud is a skill and with different analysts, the results of the investigations may vary. Thus, even in the face of limited amounts of data from the investigations, some of that data may not produce reliable learning results.

In contrast to the conventional fraud detection model tuning processes in which explicit feedback data that serves as input into the tuning process is limited in both quantity and quality, an improved technique involves including implicit feedback inferred from a fraud analyst's actions into a fraud detection model tuning process. Along these lines, as part of a tuning process, an authentication server sends electronic transactions carrying a certain amount of risk to a case management center in which fraud analysts investigate the electronic transactions to verify whether the transactions are fraudulent or non-fraudulent. In addition to receiving this explicit feedback from the case management center, however, the authentication server also receives implicit feedback indicative of attributes of the fraud analysts themselves. The authentication server then inputs these implicit feedback parameter values into a fraud detection model tuning engine that tunes the fraud detection model.

For example, the implicit feedback may take into account the seniority level of a fraud analyst carrying out an investigation of a transaction within a fraud investigation organization. When a fraud analyst is more senior, the implication is that the organization is expending more effort in performing the investigation because of the importance of the transaction. On the other hand, when the analyst is more junior, then the implication is that the organization would not expend so much effort into a relatively unimportant case. That level of seniority corresponds to an implicit feedback parameter and places the investigation result in context in terms of a weighting factor for the investigation.

Advantageously, the improved technique provides for a rich set of inputs by which a fraud detection model may be tuned. The improved technique delivers this rich set of inputs without incurring the additional expense of ordering additional explicit feedback. Further, the improved technique takes the quality of the fraud analysts' explicit feedback into account by observing their behavior. Thus, in addition to offering additional inputs into the tuning engine, the improved technique makes the tuning less dependent on the quality of explicit feedback.

One embodiment of the improved technique is directed to a method of tuning a fraud detection model in a system configured to detect fraud in electronic transactions, the fraud detection model serving to identify fraudulent transactions based on transaction identifiers. The method includes sending the electronic transactions to a fraud analyst, the fraud analyst serving to perform a manual investigation of the electronic transactions for fraud. The method also includes receiving a message that includes values of a set of implicit feedback parameters, each implicit feedback parameter of the set of implicit feedback parameters corresponding to a behavioral attribute indicative of a behavior of the fraud analyst. The method further includes inputting the values of the set of implicit feedback parameters into a fraud detection model tuning engine which serves to tune the fraud detection model based on factors including the values of the set of implicit feedback parameters.

Additionally, some embodiments of the improved technique are directed to a system constructed and arranged to tune a fraud detection model in a system configured to detect fraud in electronic transactions, the fraud detection model serving to identify fraudulent transactions based on transaction identifiers. The system includes a network interface, memory, and a controller including controlling circuitry constructed and arranged to carry out the method of tuning a fraud detection model in a system configured to detect fraud in electronic transactions.

Furthermore, some embodiments of the improved technique are directed to a computer program product having a non-transitory computer readable storage medium which stores code including a set of instructions which, when executed by a computer, cause the computer to carry out the method of tuning a fraud detection model in a system configured to detect fraud in electronic transactions.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves including implicit feedback inferred from a fraud analyst's actions into a fraud detection model tuning process. Along these lines, as part of a tuning process, an authentication server sends electronic transactions carrying a certain amount of risk to a case management center in which fraud analysts investigate the electronic transactions to verify whether the transactions are fraudulent or non-fraudulent. In addition to receiving this explicit feedback from the case management center, however, the authentication server also receives implicit feedback indicative of attributes of the fraud analysts themselves. The authentication server then inputs these implicit feedback parameter values into a fraud detection model tuning engine that tunes the fraud detection model.

Advantageously, the improved technique provides for a rich set of inputs by which a fraud detection model may be tuned. The improved technique delivers this rich set of inputs without incurring the additional expense of ordering additional explicit feedback. Further, the improved technique takes the quality of the fraud analysts' explicit feedback into account by observing their behavior. Thus, in addition to offering additional inputs into the tuning engine, the improved technique makes the tuning less dependent on the quality of explicit feedback.

Figure 1:
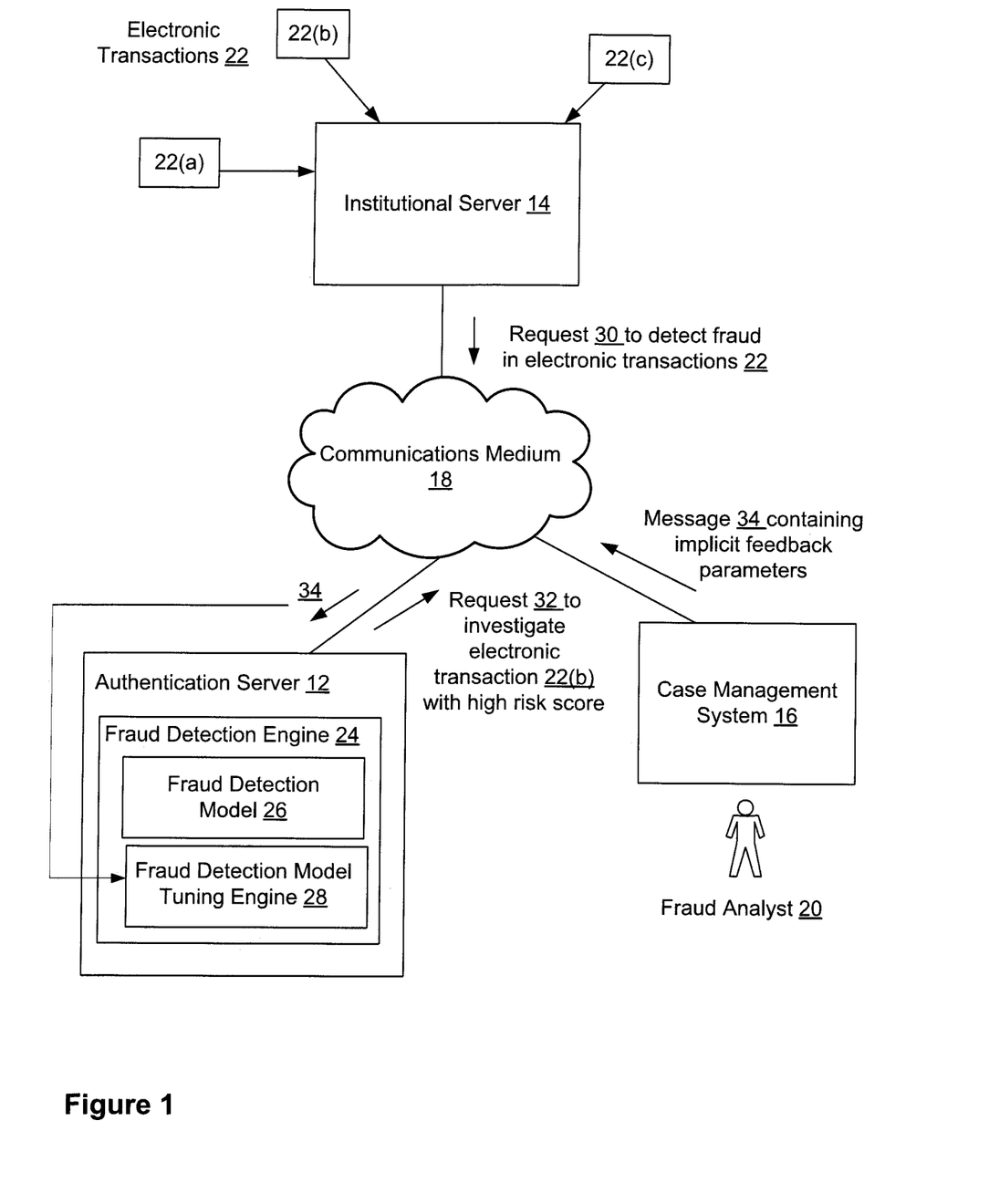
FIG. 1 is a block diagram illustrating an example electronic environment for carrying out the improved technique.

FIG. 1 illustrates an example electronic environment 10 for carrying out the improved technique. Electronic environment 10 includes authentication server 12, institutional server 14, case management 16, and communications medium 18.

Communication medium 18 provides network connections between authentication server 12, institutional server 14, and case management 16. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Institutional server 14 is tied to an institution such as a bank and is constructed and arranged to process electronic transactions 22a, 22b, and 22c (electronic transactions 22). Institutional server 14 is also constructed and arranged to send requests 30 for detection of fraud in electronic transactions 22 to authentication server 12. Request 30 includes parameter values defining electronic transactions 22.

Authentication server 12 is constructed and arranged to receive requests 30 to detect fraud in electronic transactions 22 from institutional server 14. Authentication server 14 is also constructed and arranged to send selected electronic transaction (say, 22b) to case management system 16. Authentication server 14 is further constructed and arranged to monitor fraud analysts 20 who work on case management system 16 for behavioral attributes that make up values of implicit feedback parameters. Authentication server 14 is further constructed and arranged to receive and input values of implicit feedback parameters into fraud detection model tuning engine 28. Authentication server 12 includes fraud detection engine 24, which in turn includes a fraud detection model tuning engine 28.

Fraud detection engine 24 is constructed and arranged to assess a level of risk associated with electronic transactions 22 based on output from fraud detection model 26. Fraud detection model 26 is based on values of a set of transaction parameters associated with electronic transactions 22. In some arrangements, fraud detection model 26 includes contributions from each transaction parameter, weighted by corresponding Bayesian coefficients.

Fraud detection model tuning engine 28 is constructed and arranged to take as input explicit and implicit feedback parameters received in message 34. Based on that input, fraud detection model tuning engine 28 is constructed and arranged to adjust values of the Bayesian coefficients of fraud detection model 26. Fraud detection model tuning engine 28 is a supervised learning system and is, in some arrangements, a neural network system; fraud detection model tuning engine 28 may also take on the form of other machine learning systems.

Case management system 20 is constructed and arranged to provide fraud analyst 20 access to resources to investigate whether electronic transaction 22(b) is fraudulent or non-fraudulent. Case management system 20 is also constructed and arranged to monitor and record behaviors of fraud analyst 20 corresponding to values of implicit parameters. Case management system 20 is further constructed and arranged to send message 34 to authentication server 12 containing values of explicit and implicit feedback parameters.

During operation, institutional server 14 receives electronic transactions 22 and sends request 30 to authentication server 12 over communications medium 18. Authentication server 12 input parameter values of transactions 22 into fraud detection engine 24 and produces a fraud detection result indicative of a level of risk involved in institutional server 14 processing transactions 22.

It should be understood that, in some arrangements, fraud detection engine 24 is an adaptive authentication risk score engine that assigns a risk score for each transaction. The risk score indicates a level of risk in that a high risk score indicates high risk in processing a transaction, and a low risk score indicates a low level of risk in processing the transaction.

Fraud detection engine 24 stores the electronic transaction parameter values in a database along with the assigned risk score. Periodically, authentication server 12 selects particular electronic transaction parameter values for further investigation by case management system 16. In some arrangements, authentication server 12 selects the particular electronic transaction parameter values based on the assigned risk score: the transactions having the highest risk scores are chosen for further investigation. For the purpose of discussion below, such a transaction is taken to be electronic transaction 22(b).

Case management system 16 receives request 32 to perform a manual investigation on electronic transaction 22(*b*). Case management system 20 then assigns the task of such an investigation to fraud analyst 20. Fraud analyst 20 executes particular actions in carrying out the manual investigation and comes to a conclusion as to whether transaction 22(*b*) is fraudulent or non-fraudulent.

Case management system 16, however, also records the particular actions in the course of fraud analyst 20 carrying out the investigation. For example, case management system 16 may record the seniority level of fraud analyst 20 within a hierarchy in a fraud investigation organization; when fraud analyst is more senior, the implication is that the organization is expending more effort in performing the investigation because of the importance of transaction 22(*b*). That level of seniority corresponds to an implicit feedback parameter and places the investigation result in context in terms of a weighting factor for the investigation. Other examples will be discussed below in more detail below with respect to FIGS. 3 and 4.

Once the investigation is complete, case management system 16 sends message 34 containing the investigation results and values of the implicit and explicit feedback parameters. Authentication server receives message 34 and inputs the investigation results and the values of the implicit and explicit feedback parameters into fraud detection model tuning engine 28. Fraud detection model tuning engine 28 takes in these values and the investigation result and adjusts the Bayesian coefficients of fraud detection model 26 based on this input. Further details of how fraud detection model tuning engine 28 performs such an adjustment are discussed below with respect to FIG. 4.

Figure 2:
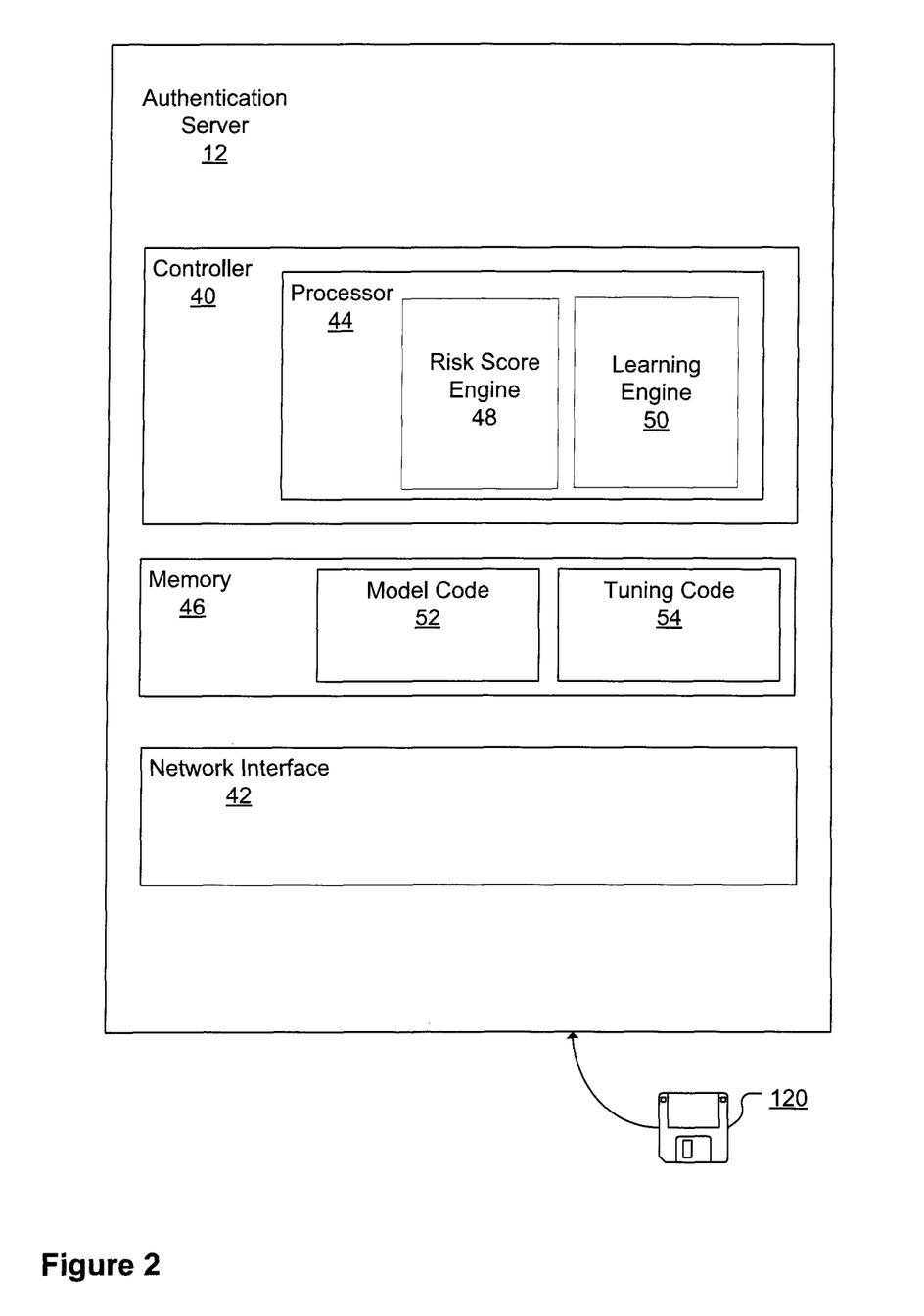
FIG. 2 is a block diagram illustrating an example authentication server within the electronic environment shown in FIG. 1.

FIG. 2 illustrates details of an example authentication server 12. Authentications server 12 includes controller 40, which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store tuning code 54 that contains instructions configured to cause processor 44 to carry out the improved technique. Memory 46 is also configured to store model code 52 which is configured to cause processor 44 to assign a risk score to a transaction 22 having transaction parameter values. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. In some arrangements, processor 44 is one of several processors working together. Processor 44 is configured to carry out the improved technique by executing model code 52 and tuning code 54. Processor 44 includes risk score engine 46 which is configured to execute model code 52 and learning engine 50 which is configured to execute tuning code 54.

During operation, processor 44 sends, via network interface 42, request 32 to investigate electronic transaction 22(*b*), which is received by case management system 16 (see FIG. 1). Request 32 includes instructions to record implicit feedback parameters. Case management system 16 assigns an investigation to fraud analyst 20 and records implicit feedback parameters according to request 32. Further details of implicit feedback parameters are discussed below with respect to FIG. 3.

Figure 3:
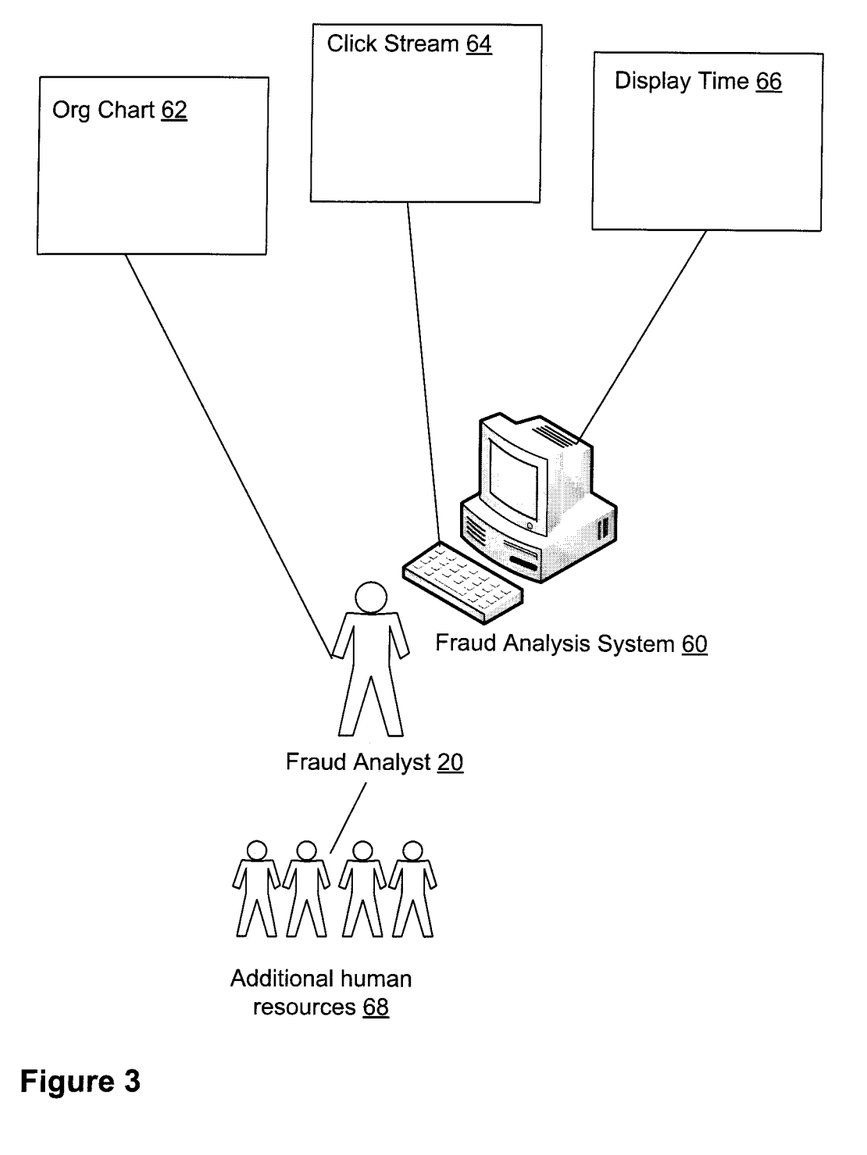
FIG. 3 is a block diagram illustrating an example fraud analysis system within the electronic environment shown in FIG. 1.

FIG. 3 illustrates an example scenario in which case management system 16 (see FIG. 1) monitors implicit feedback parameters. In this example scenario, the implicit feedback parameters monitored by case management system 16 include the place of fraud analyst within an organizational chart 62, a click stream 64 on fraud analysis system 60 on which fraud analyst 20 carries out the investigation of electronic transaction 22*b*, display time 66 of materials related to the investigation on fraud analysis system 60, and additional human resources 68 assigned to assist fraud analyst 20 with the investigation.

The values of the implicit feedback parameters are reflected in the nature of the behaviors inherent in these implicit feedback parameters. Suppose that case management 16 is associated with the institution behind institutional server 14 (see FIG. 1). Then, for example, the place within org chart 62 of fraud analyst 20 broadcasts the importance of transaction 22(*b*) to the institution. That is, it is assumed that a more senior-level analyst would be assigned to investigate the transaction only because the importance of investigating the transaction for fraud justifies the expense of using someone up high in the organization. On the other hand, a more junior-level analyst would signal that transaction 22(*b*) is not all that important and the organization places little weight in getting the result correct. It should be understood that such a judgment is approximate, and the behavior is ultimately determined by analysis of raw data.

For click stream 64, it may be assumed that more clicks within an investigation session correlates with more activity within an investigation, which implies that the investigation of transaction 22(*b*) is more important and the weight given to this implicit feedback parameter is increased. On the other hand, fewer clicks within an investigation may imply that little activity passed during the investigation and the weight given to this implicit feedback parameter is decreased. For similar reasons, it may be assumed that a longer display time 66 for materials related to the investigation on fraud analysis system 60 or more human resources 68 corresponds to a higher weight for transaction 22(*b*), and a shorter display time or less human resources 68 corresponds to less weight.

It should be understood that the behavioral attributes described above are not necessarily independent. For example, there may be correlation between click stream 64 and display time 66. Further details of such behavior are described below with respect to FIG. 4.

Figure 4:
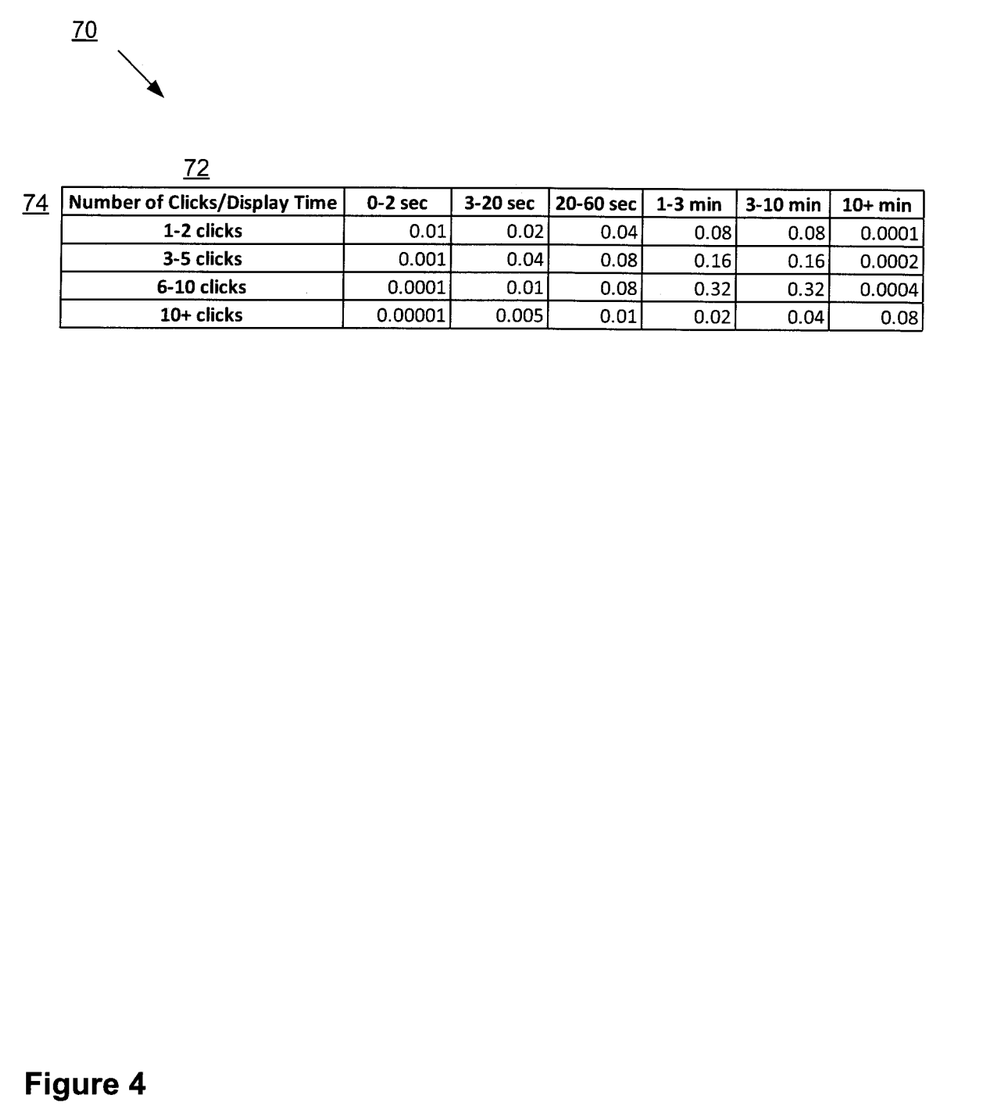
FIG. 4 is a chart illustrating example buckets of fraud evidence within the electronic system shown in FIG. 1.

FIG. 4 illustrates an array 70 of specific weights corresponding to specific ranges of values of implicit feedback parameters. In array 70, there are buckets, or ranges of values of implicit feedback parameters. In the case illustrated in FIG. 4, the buckets correspond to values of number of clicks 72 and display time 74.

In array 70, there are four ranges of values of number of clicks 72 and six ranges of values of display time 74, making for twenty-four buckets. To each bucket corresponds a weight value that is indicative of a likelihood that the result of the investigation is to be trusted. For example, the pair (4 clicks, 2 minute display time) produces a weight of 0.16 as being in the bucket (3-5 clicks, 1-3 minutes display time).

During operation, to each transaction under investigation corresponds a set of explicit feedback parameters and implicit feedback parameters. Explicit feedback parameters include transaction parameters such as user identifier, transaction amount, time of day, geolocation, and IP address, as well as the outcome of the investigation. Implicit feedback parameters are as described above.

Processor 44 arranges results of investigations received over messages such as message 34 (se FIG. 1) in a database (not pictured) over a period of time, for example a day. Processor 44 then counts the number of unique users N(bucket) within each bucket. Processor 44 counts the number of users in each bucket associated with transactions deemed as fraudulent and non-fraudulent. For each bucket, processor 44 determines an explicit probability of fraud for that bucket based on the number of users having fraudulent assessments. In some arrangements, fraud analyst 20 assigns, rather than a binary assessment of transaction 22(*b*), a confidence scale from, say, 1 to 10, that that transaction is fraudulent. In this case, the explicit fraud probability for the bucket is the maximum fraud probability for each user for that bucket.

Processor 44 then compares, for each bucket and each user in the bucket, this explicit probability to an implicit probability associated with the implicit feedback parameters. In some arrangements, the implicit probability for a bucket is given by a ratio of the weight of that bucket to sum of the weights of all of the buckets. Processor 44 selects parameter for that bucket, for that user.

Processor 44 then sums the fraud evidence parameters over all users in a bucket to reveal a fraud parameter F(bucket). Processor 44 then determines a non-fraud parameter G(bucket)=max(0, N(bucket)−F(bucket)). From these two parameters, processor 44 computes a score for a bucket according to $$S(\text{bucket}) = 1000 \log_{10}\left(\frac{F(\text{bucket})\rho + m}{G(\text{bucket}) + m}\right),$$

where $$\rho = \frac{\sum_{buckets} G(\text{bucket})}{\sum_{buckets} F(\text{bucket})}$$

and m is a constant, between about 10 and 20, for providing numerical stability.

From the score, processor 44 tunes model 26 by applying the score to weight a Bayesian coefficient associated with a bucket. For example, processor 44 may provide a weighted average of the score and a previous value of a Bayesian coefficient.

Once processor 44 updates model 26 by adjusting the Bayesian coefficients that characterize model 26, processor 44 is able to provide adjusted risk scores for new electronic transactions.

Figure 5:
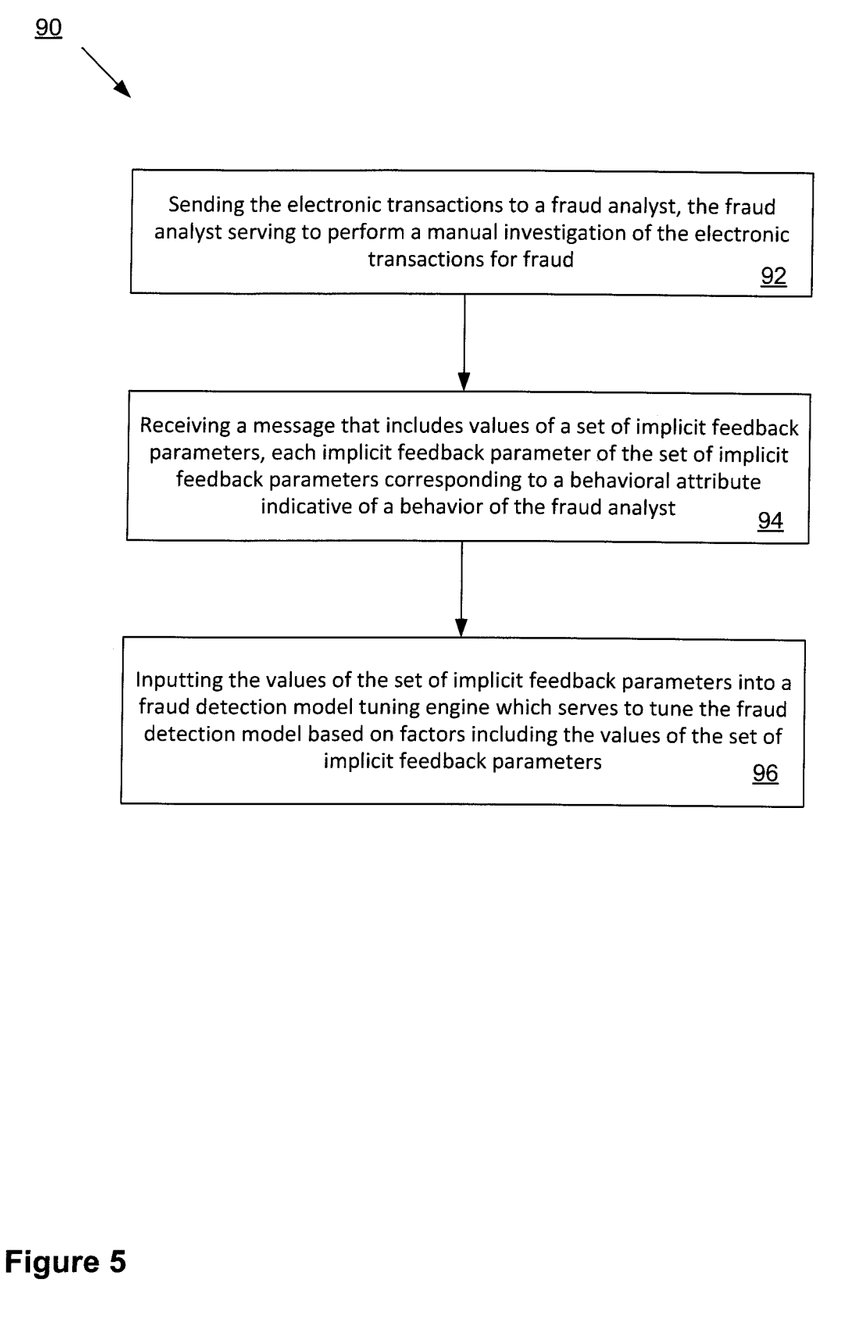
FIG. 5 is a flow chart illustrating an example method of carrying out the improved technique within the electronic environment shown in FIG. 1.

FIG. 5 illustrates a method 90 of tuning a fraud detection model in a system configured to detect fraud in electronic transactions, including steps 92, 94, and 96. In step 92, the electronic transactions are sent to a fraud analyst, the fraud analyst serving to perform a manual investigation of the electronic transactions for fraud. In step 94, a message that includes values of a set of implicit feedback parameters is received, each implicit feedback parameter of the set of implicit feedback parameters corresponding to a behavioral attribute indicative of a behavior of the fraud analyst. In step 96, the values of the set of implicit feedback parameters are input into a fraud detection model tuning engine which serves to tune the fraud detection model based on factors including the values of the set of implicit feedback parameters.

While various embodiments of the invention have been particularly shown and described, it will be understood by those skilled in the art that various changes in form and details may be made therein without departing from the spirit and scope of the invention as defined by the appended claims.

For example, it should be understood that the explicit and implicit parameters were combined for each user by considering the maximum of explicit and implicit probabilities for each user in a bucket. In some arrangements, however, the improved technique may be carried out by considering only the implicit feedback, or by considering a weighted sum of explicit and implicit probabilities for each user.

Furthermore, it should be understood that some embodiments are directed to authentication server 12, which is constructed and arranged to tune a fraud detection model in a system configured to detect fraud in electronic transactions. Some embodiments are directed to a process of tuning a fraud detection model in a system configured to detect fraud in electronic transactions. Also, some embodiments are directed to a computer program product which enables computer logic to tune a fraud detection model in a system configured to detect fraud in electronic transactions.

In some arrangements, authentication server 12 is implemented by a set of processors or other types of control/processing circuitry running software. In such arrangements, the software instructions can be delivered, within data authentication server 12, either in the form of a computer program product 120 (see FIG. 2) or simply instructions on disk or in pre-loaded in memory 46 of authentication server 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method comprising:

selecting, by an adaptive authentication risk score engine that assigns risk scores to electronic transactions, an electronic transaction for investigation by a fraud analyst into whether the electronic transaction is fraudulent;

monitoring the fraud analyst during the investigation of the electronic transaction, wherein the monitoring produces implicit feedback for the transaction, wherein monitoring the fraud analyst during the investigation of the electronic transaction comprises monitoring a fraud analysis computer on which the fraud analyst performs the investigation of the electronic transaction at least in part by the fraud analysis computer monitoring both a clickstream of the fraud analysis computer and a display time on the fraud analysis computer of materials related to the investigation of the of the electronic transaction, and wherein the implicit feedback for the transaction comprises a total number of clicks occurring on the fraud analysis computer and a display time on the fraud analysis computer of materials related to the investigation of the electronic transaction during the investigation of the electronic transaction;

producing explicit feedback for the electronic transaction, wherein the explicit feedback comprises a geolocation corresponding to the electronic transaction, a user identifier corresponding to the electronic transaction, and a result of the investigation performed by the fraud analyst into whether the electronic transaction is fraudulent, wherein the result of the investigation comprises an indication of whether the fraud analyst concluded from the investigation that the electronic transaction was fraudulent or non-fraudulent;

receiving, by the adaptive authentication risk score engine, the explicit feedback and the implicit feedback; and adjusting the adaptive authentication risk score engine for new electronic transactions based on the explicit feedback and the implicit feedback, wherein the adjusting includes producing a weight indicating reliability of the investigation result, wherein the weight corresponds to both a range of numbers of clicks including the total number of clicks occurring on the fraud analysis computer during the investigation of the electronic transaction, and a range of display times including the display time on the fraud analysis computer of materials related to the investigation of the electronic transaction during the investigation of the electronic transaction, and adjusting at least one Bayesian coefficient in a set of Bayesian coefficients in the authentication risk score engine based on the weight.

2. A method as in claim 1, further comprising:
wherein producing the weight indicating reliability of the investigation result comprises producing increased weights for larger total numbers of clicks occurring on the fraud analysis computer during the investigation of the electronic transaction and larger display times on the fraud analysis computer of materials related to the investigation of the electronic transaction during the investigation of the electronic transaction.

3. A method as in claim 1, wherein the implicit feedback for the transaction further comprises a place of the fraud analyst within an organizational chart.

4. A method as in claim 1, wherein the implicit feedback for the transaction further comprises additional human resources assigned to assist the fraud analyst with the investigation.

5. A method as in claim 1,
wherein each Bayesian coefficient of the set of Bayesian coefficients corresponds to an authentication factor;
wherein adjusting the adaptive authentication risk score engine includes:
producing an adjusted set of Bayesian coefficients based on the implicit feedback.

6. A method as in claim 5, wherein the implicit feedback comprises a set of implicit feedback parameters, and further comprising:
wherein producing the adjusted set of Bayesian coefficients includes:
forming a set of buckets of values of the implicit feedback parameters, each bucket of the set of buckets being a given range of values of the implicit feedback parameters, that bucket having been assigned a weight value indicative of a likelihood that an electronic transaction is fraudulent given that the values of the set of implicit feedback parameters are in the given range, the Bayesian coefficients being adjusted based on the value of the fraud evidence parameter.

7. A method as in claim 6,
wherein forming the set of buckets of values of the set of implicit feedback parameters includes:
for a particular bucket of the set of buckets, the particular bucket being the given range of values of the implicit feedback parameters, perform a counting operation to produce a number of users of the bucket, each of the users having submitted an electronic transaction for which the investigation of that electronic transaction has a finding based on the given range of values of the set of implicit feedback parameters; and wherein producing the adjusted set of Bayesian coefficients further includes:
for the particular bucket of the set of buckets, perform another counting operation to compute a fraction of the number of users submitting electronic transactions for which the finding of the investigation reveals fraud, the fraction of the number of users being indicative of a likelihood that the particular bucket implies fraud, and
adjusting the set of Bayesian coefficients of the fraud detection model based on the fraction of the number of users.

8. A method as in claim 7,
wherein producing the adjusted set of Bayesian coefficients further includes:
selecting, as a Bayesian input, the larger of the fraction of the number of users and the weight value, and
inputting the Bayesian input into the fraud detection model tuning engine.

9. An apparatus comprising:
a network interface;
memory; and
a controller coupled to the network interface and the memory, the controller including controlling circuitry constructed and arranged to:
select, by an adaptive authentication risk score engine that assigns risk scores to electronic transactions, an electronic transaction for investigation by a fraud analyst into whether the electronic transaction is fraudulent;
monitor the fraud analyst during the investigation of the electronic transaction, wherein the monitoring produces implicit feedback for the transaction, wherein the fraud analyst is monitored during the investigation of the electronic transaction at least in part by monitoring a fraud analysis computer on which the fraud analyst performs the investigation of the electronic transaction at least in part by the fraud analysis computer monitoring both a clickstream of the fraud analysis computer and a display time on the fraud analysis computer of materials related to the investigation of the of the electronic transaction, and wherein the implicit feedback for the transaction comprises a total number of clicks occurring on the fraud analysis computer and a display time on the fraud analysis computer of materials related to the investigation of the electronic transaction during the investigation of the electronic transaction;
produce explicit feedback for the electronic transaction, wherein the explicit feedback comprises a geolocation corresponding to the electronic transaction, a user identifier corresponding to the electronic transaction, and a result of the investigation performed by the fraud analyst into whether the electronic transaction is fraudulent, wherein the result of the investigation comprises an indication of whether the fraud analyst concluded from the investigation that the electronic transaction was fraudulent or non-fraudulent;
receive, by the adaptive authentication risk score engine, the explicit feedback and the implicit feedback; and adjust the adaptive authentication risk score engine for new electronic transactions based on the explicit feedback and the implicit feedback, wherein adjustment of the adaptive authentication risk score engine includes
producing a weight indicating reliability of the investigation result, wherein the weight corresponds to both
a range of numbers of clicks including the total number of clicks occurring on the fraud analysis computer during the investigation of the electronic transaction, and
a range of display times including the display time on the fraud analysis computer of materials related to the investigation of the electronic transaction during the investigation of the electronic transaction, and
adjusting at least one Bayesian coefficient in a set of Bayesian coefficients in the authentication risk score engine based on the weight.

10. An apparatus as in claim 9, further comprising:
wherein the controlling circuitry is further constructed and arranged to produce a weight indicating reliability of the investigation result at least in part by producing increased weights for larger total numbers of clicks occurring on the fraud analysis computer during the investigation of the electronic transaction and larger display times on the fraud analysis computer of materials related to the investigation of the electronic transaction during the investigation of the electronic transaction.

11. An apparatus as in claim 9, wherein the implicit feedback for the transaction further comprises a place of the fraud analyst within an organizational chart.

12. An apparatus as in claim 9, wherein the implicit feedback for the transaction further comprises additional human resources assigned to assist the fraud analyst with the investigation.

13. A computer program product having a non-transitory, computer-readable storage medium which stores code for detecting fraud in electronic transactions, the code including instructions which, when executed by a computer, causes the computer to perform a method comprising:
selecting, by an adaptive authentication risk score engine that assigns risk scores to electronic transactions, an electronic transaction for investigation by a fraud analyst into whether the electronic transaction is fraudulent;
monitoring the fraud analyst during the investigation of the electronic transaction, wherein the monitoring produces implicit feedback for the transaction, wherein monitoring the fraud analyst during the investigation of the electronic transaction comprises monitoring a fraud analysis computer on which the fraud analyst performs the investigation of the electronic transaction at least in part by the fraud analysis computer monitoring both a clickstream of the fraud analysis computer and a display time on the fraud analysis computer of materials related to the investigation of the of the electronic transaction, and wherein the implicit feedback for the transaction comprises a total number of clicks occurring on the fraud analysis computer and a display time on the fraud analysis computer of materials related to the investigation of the electronic transaction during the investigation of the electronic transaction;
producing explicit feedback for the electronic transaction, wherein the explicit feedback comprises a geolocation corresponding to the electronic transaction, a user identifier corresponding to the electronic transaction, and a result of the investigation performed by the fraud analyst into whether the electronic transaction is fraudulent, wherein the result of the investigation comprises an indication of whether the fraud analyst concluded from the investigation that the electronic transaction was fraudulent or non-fraudulent;
receiving, by the adaptive authentication risk score engine, the explicit feedback and the implicit feedback; and
adjusting the adaptive authentication risk score engine for new electronic transactions based on the explicit feedback and the implicit feedback, wherein the adjusting includes
producing a weight indicating reliability of the investigation result, wherein the weight corresponds to both
a range of numbers of clicks including the total number of clicks occurring on the fraud analysis computer during the investigation of the electronic transaction, and
a range of display times including the display time on the fraud analysis computer of materials related to the investigation of the electronic transaction during the investigation of the electronic transaction, and
adjusting at least one Bayesian coefficient in a set of Bayesian coefficients in the authentication risk score engine based on the weight.

\* \* \* \* \*